United States Patent
Guenther et al.

(10) Patent No.: US 9,483,038 B2
(45) Date of Patent: Nov. 1, 2016

(54) SYSTEM FOR GENERATING OR MODIFYING CAMS

(71) Applicant: ROCKWELL AUTOMATION TECHNOLOGIES, INC., Mayfield Heights, OH (US)

(72) Inventors: Robert Guenther, Linden (DE); Joachim Thomsen, Krefeld (DE); Robert Miklosovic, Strongsville, OH (US); Brian Fast, Kirtland, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 398 days.

(21) Appl. No.: 14/244,045

(22) Filed: Apr. 3, 2014

(65) Prior Publication Data

US 2015/0286193 A1 Oct. 8, 2015

(51) Int. Cl.
  *G05B 21/00* (2006.01)
  *G05B 15/02* (2006.01)
  *G05B 19/4103* (2006.01)

(52) U.S. Cl.
  CPC ........... *G05B 15/02* (2013.01); *G05B 19/4103* (2013.01)

(58) Field of Classification Search
  None
  See application file for complete search history.

(56) References Cited

U.S. PATENT DOCUMENTS

| | | | | |
|---|---|---|---|---|
| 6,205,372 B1* | 3/2001 | Pugh | .................... | G05B 19/186 700/180 |
| 6,236,908 B1* | 5/2001 | Cheng | ................. | F02D 41/0062 701/1 |
| 2016/0138505 A1* | 5/2016 | Nefzer | ................ | F02D 41/1401 702/151 |

OTHER PUBLICATIONS

Rockwell Automation; "User Manual, Motion Analyzer Software" Version 7.00; Oct. 1, 2012, pp. 1-5 and 139-177; (44) pages.
Luigi Biagiotti et al.: "Trajectory Planning for Automatic Machines and Robots"; pp. 1-41,150-155, 160-193, 223-231, and 234-245; Nov. 3, 2008, Springer-Verlag, Berlin Heidelberg, ISBN: 978-3-540-85628-3; (51) pages.
Extended European Search Report dated Feb. 18, 2016; European Application No. 15161615.8—(11) pages.

* cited by examiner

*Primary Examiner* — Evral E Bodden
(74) *Attorney, Agent, or Firm* — Boyle Fredrickson, S.C.

(57) ABSTRACT

A system for generating electronic cam profiles mimicking the action of mechanical cams operates on a variety of different cam profile inputs and converts them into a common form, for example, expressed as a polynomial spline and modifies that common form by predetermined adjustment relationships, for example by scaling coefficients of the common form cam profile according to desired changes in cam function and/or limitations in dynamic cam values input by a user. The common form of the cam profile may be obtained from a table of cam values by spline interpolation of those data values.

20 Claims, 5 Drawing Sheets

SYSTEM FOR GENERATING OR MODIFYING CAMS

BACKGROUND OF THE INVENTION

The present invention relates to industrial control systems providing motion control and in particular to a system of generating electronic cams used for programming motion control.

Mechanical cams may convert a rotary motion to a periodic linear motion, for example, through the use of a cam wheel having an irregular radius and attached to a rotating shaft. A follower riding along the perimeter of the cam wheel moves in and out according to the angle of the shaft and the radius of the cam wheel currently in contact with the follower.

Modern industrial control systems may implement cam motion by abstracting the cam as a set of points of a cam function or cam equation. The desired linear motion may then be implemented by an alternative technology such as a servo actuator without the need for a mechanical cam. By creating a virtual cam, the benefits of cam type motion are in the form of predetermined and well-defined velocities, acceleration, and jerk (the derivative of acceleration) and these characteristic may be easily modified via software modifications.

A variety of tools exist for the generation of virtual cam profiles for new designs. Normally the profiles from these tools are captured as a set of points in a cam profile table, for example, linking shaft rotation values with given linear motion values. These complex tools are very specific and are not flexible enough to meet the needs of all designs. Therefore most designers have additional tools and proprietary profiles that provide the ability to meet the needs of their design. Thus developing a successful cam profile can be extremely complex requiring expert assistance.

A common requirement in cam design is to replicate and modify a portion of an existing profile, when the original designer is not available, and the only information still in existence are a set of points used to define the input to output translation. As part of the replication it is often required to modify portions of the profile (such as distances or ratios) while maintaining the same behavior, i.e. maintaining the boundary conditions. Unfortunately, conventional tools and algorithms used to modify the design are incomplete and will often distort the original profile. Thus additional mathematical information used during the creation of the original profile needs to be available, in the form of re-engineering, reverse engineering or manual segmentation (splitting the profile into many segments in an attempt to control the overall profile). The result of this process is typically limiting (not all parts of all segments can be scaled within the given boundaries) or expensive (it takes significant time to regenerate the original design).

SUMMARY OF THE INVENTION

The present invention provides a cam development tool that can allow ready modification of existing virtual cams expressed in a variety of different forms, for example mathematical equations, cam tables, or discretely sampled relationships. This approach converts cams expressed in a multiple of different forms into a well-characterized form, termed a "base profile". The well-characterized form is associated with pre-developed adjustment relationships which describe changes in the parameters of the well-characterized form necessary to implement changes in the cam performance. Cam modification instructions describing desired changes in cam performance may then be applied through the adjustment relationships to the well-characterized forms to output a modified cam profile.

Specifically, the invention provides a method or apparatus for generating virtual cam profiles that may receive a profile expressed in any of multiple forms describing a cam output variable and a cam input variable, where the cam output variable is a function of the earn input variable. The profile is converted into a base profile providing a functional expression relating the cam output to the cam input and having function parameters of a predetermined type, where the functional expression is associated with a set of adjustment relationships describing changes in the function parameters to produce changes in cam performance. Specifically, the base profile is a polynomial having polynomial coefficients in the adjustment relationships describes scaling of the polynomial coefficients to change cam performance in particular ways. Cain modification instructions are received indicating desired changes in cam performance and applied to the adjustment relationships to modify the function parameters so that a modified characterized profile can be output, the modified characterized profile describing earn inputs and cam outputs related by the functional expression with the modified function parameters.

It is thus a feature of at least one embodiment of the invention to provide a method of modifying existing cam profiles that can work with a variety of different types of cam profile expressions including earn tables, closed form expressions and even mechanical cams that can be physically measured. By preparing predefined adjustment relationships that work with a common expression form, and converting the different cam profile expressions into this common form, simple modification of cam performance can be obtained for each of these different types of cam profile expressions.

The base profile may be is a piecewise mathematical expression defined between multiple cam output values.

It is thus a feature of at least one embodiment of the invention to provide an arbitrarily complex base profile that can be assembled out of simple, well characterized functions susceptible to readily discoverable predefined adjustment relationships.

The multiple cam output values are points of zero acceleration in the cam profile.

It is thus a feature of at least one embodiment of the invention to provide a base profile that permits localized modifications to a segment without affecting other segments.

The base profile may be a piecewise polynomial spline.

It is thus a feature of at least one embodiment of the invention to provide a base profile using a well understood mathematical form.

The modification of the characterized profile may individually scale each segment and then piecewise assemble the segments after scaling to provide a modified characterized profile.

It is thus a feature of at least one embodiment of the invention to permit varied modifications of different portions of the cam profile.

The cam modification instructions may be for modifications of at least one of cam output position change for given cam input change and cam output velocity change for given cam input change.

It is thus a feature of at least one embodiment of the invention to provide for two commonly desired modifications of cam profiles: changing the profile excursion or maximum profile speed at various points.

The method may include the step of determining dynamic properties of the modified characterized profile.

It is thus a feature of at least one embodiment of the invention to provide well-characterized cam profile modifications readily analyzed and understood by the user.

The cam modification instructions may describe limitations on cam dynamics selected from the group consisting of acceleration and jerk.

It is thus a feature of at least one embodiment of the invention to permit modifications of cam profiles based on dynamic constraints in addition to specific changes in profile velocity or position.

The method may include the step of generating the characterized profile from a set of discrete points describing a cam profile.

It is thus a feature of at least one embodiment of the invention to permit generation of new cams from legacy cam designs that may be only represented by a set of data points.

The discrete data points may be converted to spline form by spline interpolation between the discrete points.

It is thus a feature of at least one embodiment of the invention to use well-understood techniques to provide a common expression of the cam profile for modification.

The modified characterized profile may be output to control an actuator according to a cam output signal being a function of a cam input signal sensed from a sensor applied to the modified characterized profile.

It is thus a feature of at least one embodiment of the invention to improve and simplify the process of generating virtual cam profiles for industrial control.

The spline interpolation may use a combination of linear segments and third order polynomials.

It is thus a feature of at least one embodiment of the invention to provide a computationally tractable interpolation process practical in an industrial control environment.

These particular objects and advantages may apply to only some embodiments falling within the claims and thus do not define the scope of the invention.

DETAILED DESCRIPTION OF THE PREFERRED EMBODIMENT

Figure 1:
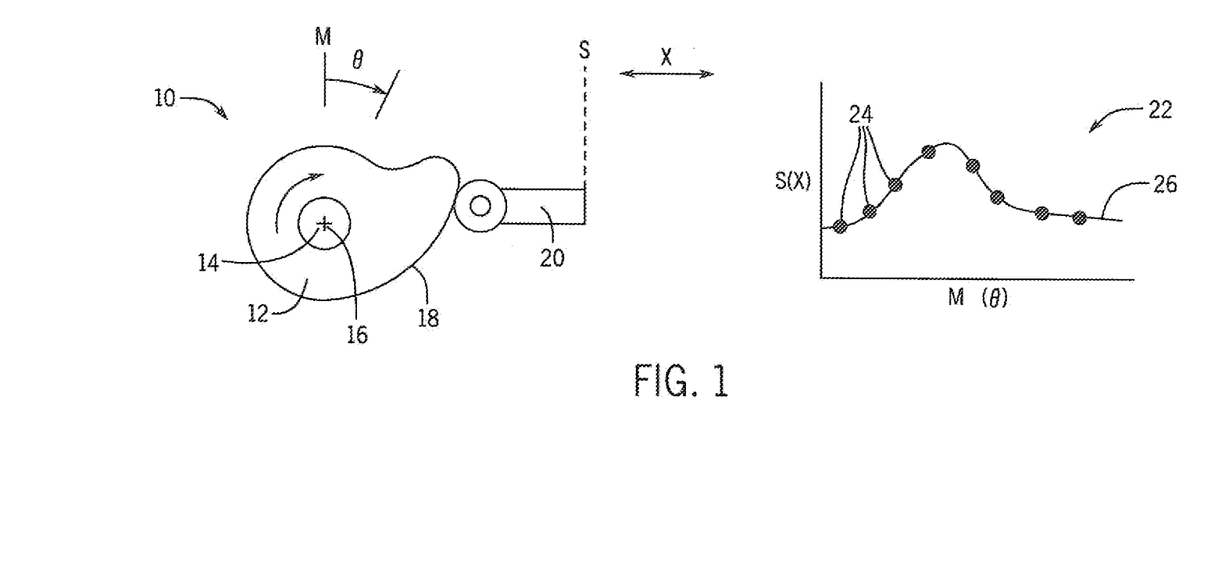
FIG. 1 is a simplified diagram of a conventional mechanical cam and its electronic profile that may be used for electronic cam operation.

Referring now to FIG. 1, a mechanical cam 10 may provide for a cam wheel 12 rotating about an axis 14 on the shaft 16, the shaft 16 defining a cam input (M) with respect to its angle θ. The cam wheel 12 may have a periphery 18 of varying radius with respect to axis 14 to move a follower 20 inward and outward along an x-axis defining a cam output (S). This example is but one of a number of possible cam designs which also include linear cams where the cam input is motion along an axis and the can output is motion along another axis. Similarly, the cam wheel may, for example, be a crank arm and lever combination or the like.

The functional relationship between the cam input and cam output may be expressed as a cam profile 22 providing a set of cam data points 24 approximating a cam profile function 26.

Figure 2:
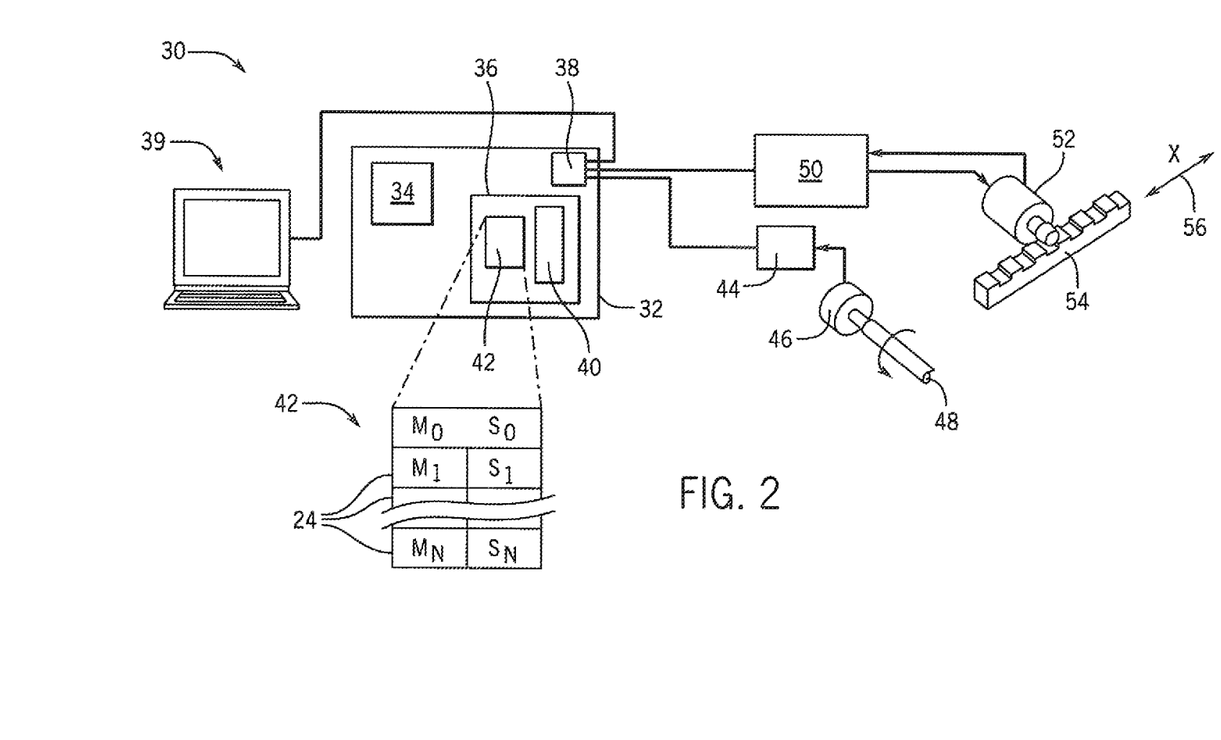
FIG. 2 is a schematic block diagram of an industrial controller implementing an electronic cam using the profile of FIG. 1.

Referring now to FIG. 2, an industrial control system 30 may include an electronic computer 32 providing one or more processors 34 communicating with electronic memory 36 and interface circuitry 38. Electronic memory 36 may include a control program 40, for example, expressed in the ladder logic or function block form as is understood in the art and may implement an electronic cam defined by a profile data structure 42. The profile data structure 42 may store a set of cam data points 24 discussed above with respect to FIG. 1 as a set of linked pairs of cam input values $M_i$ and cam output value $S_i$. Alternatively, profile data structure 42 may express the cam profile as a functional relationship, for example, as a spline or as an explicit equation describing the function of the cam profile function 26.

The electronic computer 32 may connect through the interface circuitry 38 with an I/O module 44, for example, receiving an angle value (θ) from an encoder 46 attached to a rotating shall 48 communicating with a machine. The angle value provides the cam input $M_i$ which is used to index the profile data structure 42 to identify the corresponding cam output value $S_i$ (x). This cam output value $S_i$ may be provided, for example, through interface circuitry 38 to a servo motor drive 50 communicating with a servo motor 52, for example, driving a rack 54 to provide a translation along an axis 56.

Desirably, the relationship between $M_i$ and $S_i$ described by the profile data structure 42 produces not only the necessary functional relationship between an angle value (θ) and motion (x) along the axis 56 but also provides a desired dynamic characteristic of the motion characterized by peak or minimum velocities, peak or minimum accelerations, and peak or minimum jerk.

A variety of other electronic cam configurations are also contemplated by the present invention including those which translate between rotation and rotation, translation and rotation, and other motions.

The electronic computer 32 may also connect to a human machine interface 39, for example, a graphics terminal providing a graphic display screen and a user input device such as a keyboard or the like.

Figure 3:
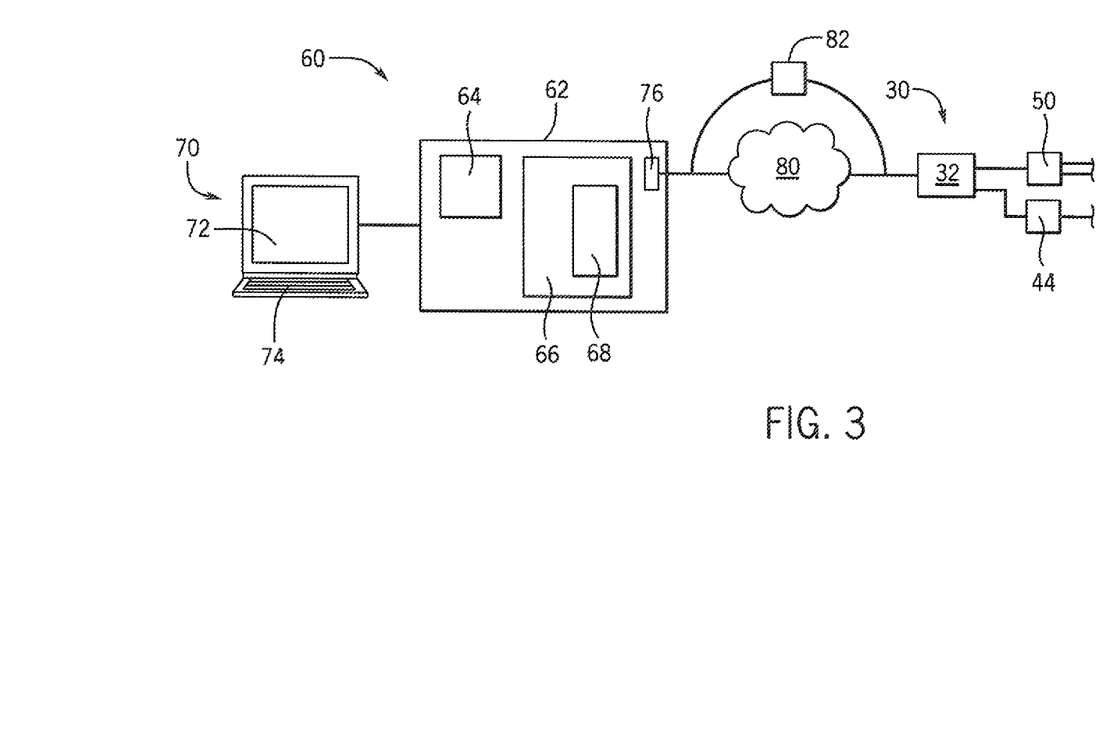
FIG. 3 is a block diagram of an electronic computer implementing a program of the present invention for transfer of electronic cam profiles to the industrial controller of FIG. 2.

Referring now to FIG. 3, the present invention provides a system 60 for generating cam profiles for use in the profile data structure 42 of FIG. 2. Generally, the system 60 may include electronic computer 62 providing for one or more processors 64 communicating with a memory 66 holding a stored program 68 as will be discussed in greater detail below. The computer 62 may provide for a human machine interface 70 including a graphic display terminal 72 and keyboard 74 or other input device such as a touchscreen or cursor control element. An interface 76 of the computer 62 may communicate, for example, by a network 80 or by transfer of discrete media 82 with the industrial control system 30 described above for transfer of information from the industrial control system 30 to the computer 62 in the form of a profile data structure 42 as will be discussed when the transfer of the desired new cam profile into profile data structure 42 is used in controlling the controller 30 as discussed above.

Figure 4:
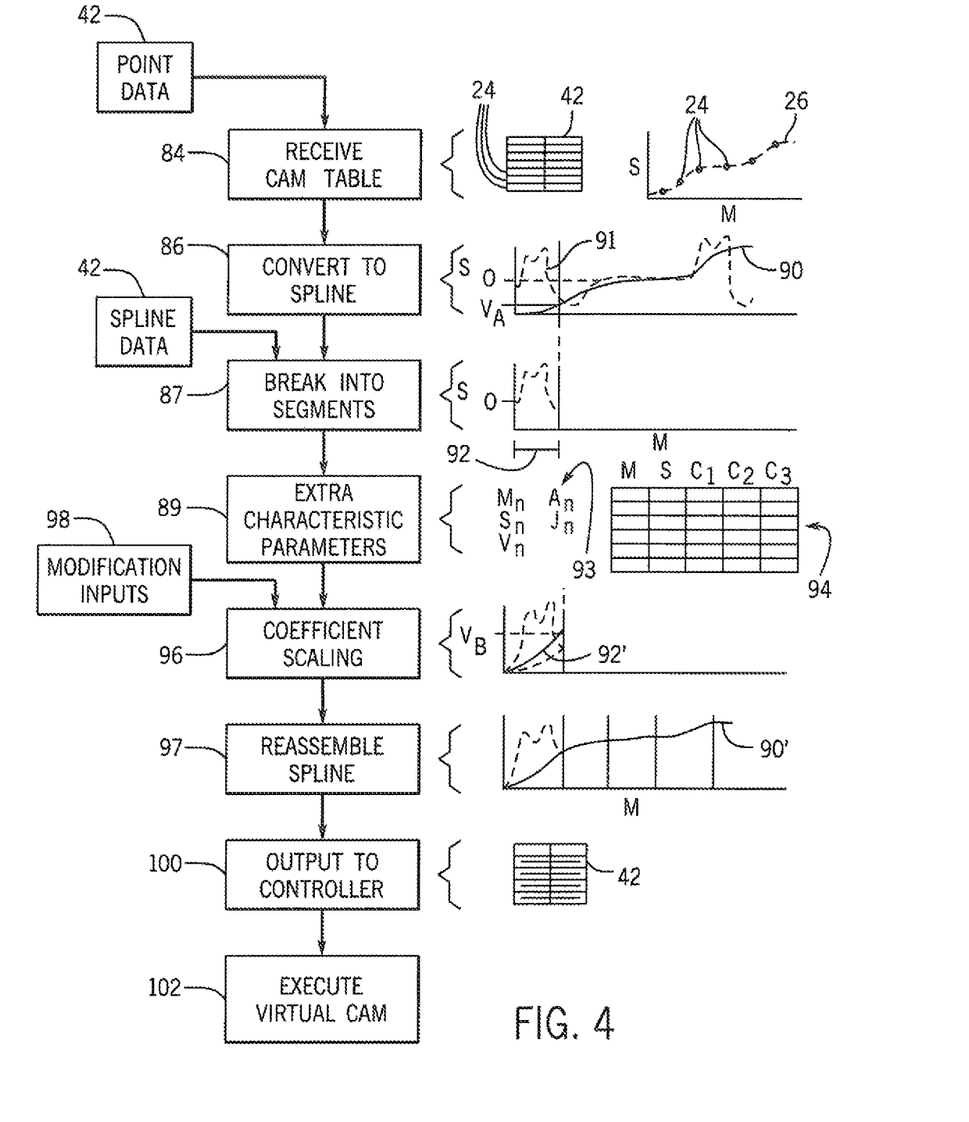
FIG. 4 is a flowchart and tandem data representations showing the process of the present invention in preparing and modifying an electronic cam profile.

Referring now to FIG. 4, the program 68 may optionally receive the contents of a profile data structure 42 of a pre-existing cam as indicated by process block 84. The profile data structure 42 will provide a base cam that can be modified by the program 68. As noted above, the profile data structure 42 may hold any of an equation, a spline, or a set of cam data points 24 describing a cam profile function 26.

The latter case of the profile data structure 42 holding cam data points 24 is particularly interesting in many real-world examples where the only description of a successful cam profile, for example, running on current equipment, is a set of discrete, linked cam data points 24 each associated with a cam input and cam output. This information may be input, as discussed in FIG. 3, by discrete media 82 or through a network 80 including a local network or the Internet.

At process block 86, the contents of the profile data structure 42 in the form of cam data points 24 used by an existing control program or from a set of stored templates holding cam data points 24 for general use may be converted into a form of a spline 90. This conversion process may include identifying each pair of the linked cam data points 24 to a spline type (generally linear or cubic) and then providing for a spline interpolation according to generally understood techniques.

A third order (cubic) spline generally has the form of:

$$S = S_0 + C_1(M-M_p) + C_2(M-M_p)^2 + C_3(M-M_p)^3 \quad (1)$$

where:

S is the value of the cam output ($S_0$ is the initial cam output value);

M is the value of the cam input;

$M_p$ is the value of the cam input at the starting point of the spline segment or functional segment 92, and $C_1$, $C_2$, $C_3$ are the polynomial coefficients of a third order polynomial from order 1 to 3, The spline 90, which describes a position of the cam output value $S_i$ (x) as a function of the cam input value $M_i$ ($\theta$), may be processed to determine and to display dynamic qualities of the cam so described including, for example: velocity, acceleration 91, and jerk (only acceleration 91 is shown for clarity).

As indicated by process block 87, the spline 90 may be broken into segments 92 between points where the acceleration 91 crosses through zero acceleration. Each of the segments 92, as the spline 90 is so decomposed, will consist of multiple spline polynomials each identified by a range of cam input values $M_i$ ($\theta$) and corresponding cam output values $S_i$ (x). The polynomials may be characterized by up to three coefficients for third order polynomial.

Dividing the spline 90 into the segments 92 allows modification of the segments 92 individually and their subsequent reassembly back into a spline 90.

If the original base cam was expressed as a spline in the profile data structure 42, process blocks 84 and 86 may be skipped and the spline described by the profile data structure 42 receive directly to be broken into segments 92.

At process block 89, each of the segments 92 has its characteristic parameters 93 extracted including:

Mn which is a range of the cam input of the segment;

Sn which is a range of the cam output of the segment;

Vn which is a change in velocity from the beginning of the segment to the end of the segment (e.g. starting velocity minus pending velocity);

An is a peak acceleration within the segment; and

Jn is a peak jerk within the segment.

At this point each of the segments 92 is fully captured in its characteristic parameters 93 over the entire segment and spline data 94 consisting of linked cam data points for cam input values $M_i$ ($\theta$) and cam output values $S_i$ (x) together with the coefficients of the splines between those ranges.

A characterized segment 92 may be stored for future use or used immediately for the generation of a modified cam. In either case, a new cam profile may be generated by assembling segments 92 from the original base cam or chosen from a library of unrelated segments 92. Typically, segments 92 in an existing cam profile function 26 having functioned well in the past will be employed.

Per process block 96, each of the segments 92 may be modified by coefficients scaling according to modification values 98. Typical modifications, for example, will increase the excursion distance of the cam output, or its velocity, and may make changes to the segment 92 subject to constraints, for example, a maximum acceleration or jerk.

When it is desirable to scale the segment 92 to create a new segment 92 the design technique supports the ability to constrain any three of the six parameters, listed below, at a time. Each combination of constrained parameters requires specific sealing equations.

Modification of segment 92 with respect to position can be done by a simple scaling of the values of the cam output values $S_i$ (x) by a constant scaling factor (or analogous countervailing scaling of cam input value $M_i$ ($\theta$)). One or more of the segments 92 may be independently scaled in this way (e.g. with different scaling factors) and fit back together as will be described below.

Figure 5:
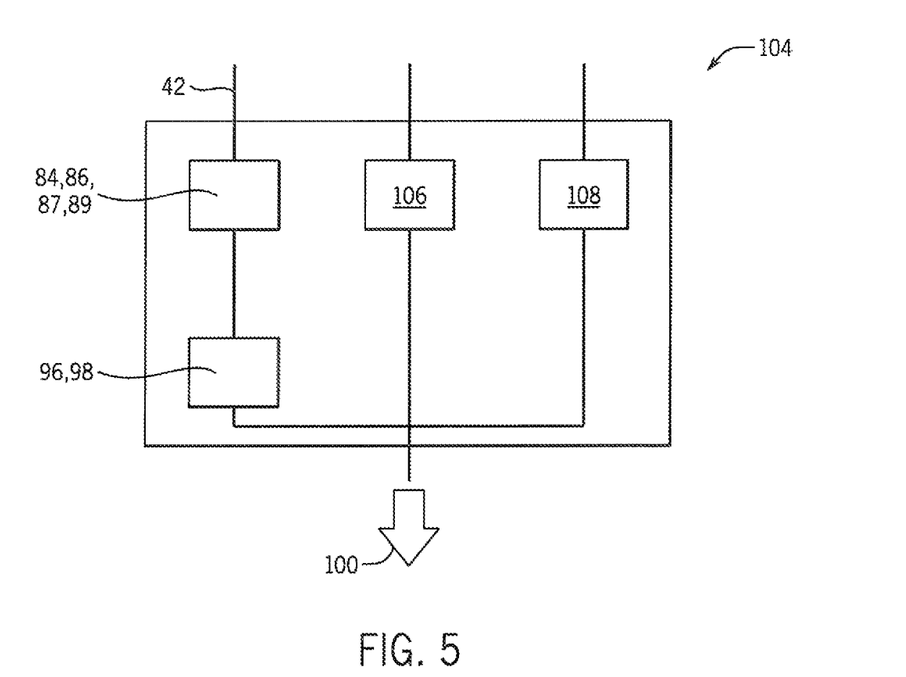
FIG. 5 is a block diagram of a cam generation suite of which the program of FIG. 4 may be a component.

Modification of the segment 92 with respect to velocity requires a more sophisticated coefficients scaling process. Referring to FIG. 5, a velocity scaling may desirably increase the final velocity of segment 92 from $V_A$ to $V_B$, for example, the former being the corresponding velocity in the spline 90 originally received at process block 84.

A given profile of the segment 92 with a cubic spline will be fully described by the following six parameters where:

V0 is a start velocity of the segment;

V1 is an end velocity of the segment;

dS is a cam output position range of the segment;

dM is a cam input position range of the segment;

Amax is a peak acceleration within the segment; and

Jmax is a peak jerk within the segment.

So, for example, a new segment 92' being a modified version of segment 92, may be described with the values V0, V1, and dS. These values provide modification values 98 describing a desired modification of the segment 92 and may be used to derive the remaining of the six above described parameters as follows:

$$dM = \frac{dS}{K2} \quad (2)$$

$$A = \frac{V1 - V0}{dM} * \left(M_n * \frac{A_n}{V_n}\right) \quad (3)$$

$$J = \frac{A}{dM} * J_n * \frac{M_n}{A_n} \quad (4)$$

where:

$$K2 = V_0 + (V1 - V0) * \frac{S_n}{V_n M_n} \quad (5)$$

If $K2 > 0$. $\quad (6)$

These modification values 98 (the values derived from them) may be used to determine the necessary coefficients scaling of each of the polynomials of the segment 92 as follows:

$$C_{1new} = \frac{V1 - V0}{Vn} * C_1 + V0 \qquad (7)$$

$$C_{2new} = \frac{V1 - V0}{Vn} * C_2 * \frac{Mn}{dM} \qquad (8)$$

$$C_{3new} = \frac{V1 - V0}{Vn} * C_3 * \left(\frac{Mn}{dM}\right)^2 \qquad (9)$$

where $C_1$, $C_2$, and $C_3$ are the original coefficient values for the unmodified segment 92 and $C_{1new}$, $C_{2new}$, $C_{3new}$, $V_0$, $V_1$ and dM are the modifications desired (or derived from those modifications) and Mn and Vn are the characteristic parameters 93 of the original segment 92.

For subsequent segments following 92, the starting cam input and output values must be made to match the ending cam input and output values of the current segment.

When the segment is described not by a cubic spline but by a line, the velocity profile of the segment 92 will be fully described by three parameters:

V which is a constant velocity;
dM which is a cam input range; and
dS which is a cam output range.

The relationship between these parameters is as follows:

$$dS = V * dM. \qquad (10)$$

Accordingly, a desired increase in velocity may simply scale the V term. Again the segment 92 must be offset at its leading boundary to match the cam output value of the trailing boundary of the preceding segment 92 by a simple offsetting process.

At process block 97, each of the scaled segments 92 may then be reassembled. The scaling process preserves the zero acceleration values at the boundaries of the segments 92 allowing them to be simply spliced together to produce new spline 90 without acceleration velocity or position discontinuities.

At process block 100 the new spline 90' may be evaluated at regular intervals and these points may then be enrolled in a new profile data structure 42 as cam data points 24.

At process block 102, the new profile data structure 42 may be executed in the controller for use in controlling a virtual cam in an industrial operation.

For any of the segments 92, it may be desirable to constrain certain dynamic qualities of a segment 92, for example, a peak acceleration, to less than a certain amount. In this case, the modification values selected from the six parameters characterizing a cubic spline segment 92 (described above) must include a value of peak acceleration, An, instead of the value of dS.

As before, the remaining values of dM, dS and J may be computed from the modification values as follows:

$$dM = \frac{V1 - V0}{A}(M_n A_n / V_n) \qquad (11)$$

$$dS = dM\left(V0 + dM * A * \frac{S_n}{A_n M_n^2}\right) \qquad (12)$$

$$J = \frac{A}{dM} * J_n * \frac{M_n}{A_n} \qquad (13)$$

The change in the value of dS may be accommodated by a corresponding offsetting change in dS in the succeeding segment. So if dS in the current segment 92 must be lengthened, a shortened dS may be used in the modification of the subsequent segment.

Referring now to FIG. 5, the present invention may be incorporated into a cam design suite 104 executing as a program on the computer 62. The cam design suite 104 may receive, for example, a data structure 42 as was described above, to generate a spline if necessary per process blocks 84, 86, 87, and 89 of FIG. 5 and then to accept a modification from the user at process blocks 96 and 97 to generate a new cam profile that may be output from the cam design suite 104 per process block 100. As a further part of the cam design suite 104, a procedural cam generation program 106 may allow cam calculation directly from polynomials specified by the user up to the ninth order. In addition, an inverse kinematics program 108 may allow cam calculation to be performed by inverse kinematics where the structure of a machine is defined and simulated in operation to extract the necessary cam data points 24.

At each stage in this cam generation process, graphical representations of the cam and its dynamic qualities of velocity, acceleration, and jerk may be displayed together with peak values and starting and ending position values.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained

What we claim is:

1. A method of generating virtual cam profiles employing an electronic computer having a human machine interface and executing a program in non-transitory medium to perform the steps comprised of:
   (a) receiving a profile expressed in any of multiple forms describing a cam output variable and a cam input variable, where the cam output variable is a function of the cam input variable;
   (b) converting the profile from multiple forms into a base profile providing a polynomial relating the cam output to the cam input and having polynomial coefficients, where the polynomial is associated with a set of predetermined adjustment relationships describing scaling of the polynomial coefficients to produce changes in cam performance;
   (c) receiving cam modification instructions indicating desired changes in cam performance and using predetermined adjustment relationships to modify the polynomial by scaling the polynomial coefficients; and
   (d) outputting a modified characterized profile describing cam inputs and cam outputs derived from the polynomial with the modified polynomial coefficients.

2. The method of claim 1 wherein the polynomial is a piecewise polynomial defined between multiple cam output values.

3. The method of claim 1 wherein the multiple cam output values are points of zero acceleration in the cam profile.

4. The method of claim 1 wherein the base profile is a piecewise polynomial spline.

5. The method of claim 1 wherein the characterized profile is partitioned into a set of segments having a value of zero acceleration at segment endpoints and wherein step (e) modifies the characterized profile by individually scaling each segment and then piecewise assembles the segments after scaling to provide a modified characterized profile.

6. The method of claim 1 wherein the cam modification instructions are modifications of at least one of cam output position change for given cam input change and cam output velocity change for given cam input change.

7. The method of claim 6 wherein the cam modification instruction is an instruction to change a given cam velocity by a given amount.

8. The method of claim 1 further including the step of determining dynamic properties of the modified characterized profile.

9. The method of claim 1 wherein the cam modification instructions describe limitations on cam dynamics selected from the group consisting of acceleration and jerk.

10. The method of claim 1 further including the step of generating the characterized profile from a set of discrete points describing a cam profile.

11. The method of claim 10 wherein the step of generating the characterized profile performs a spline interpolation between the discrete points.

12. The method of claim 11 wherein the spline interpolation uses a combination of linear segments and third order polynomials.

13. The method of claim 1 further including the step of using the output-modified characterized profile to control an actuator according to a can output signal being a function of a cam input signal sensed from a sensor applied to the modified characterized profile.

14. An electronic computer having a human machine interface and executing a program stored in non-transitory medium to perform the steps comprised of:
   (a) receiving a cam profile expressed in any of multiple forms describing a cam output variable and a cam input variable, where the cam output variable is a function of the cam input variable;
   (b) converting the cam profile from one of the multiple forms into a base profile providing a polynomial relating the cam output to the cam input and having polynomial coefficients, where the polynomial is associated with a set of predetermined adjustment relationships describing scaling of the polynomial coefficients to produce changes in cam performance;
   (c) receiving cam modification instructions indicating desired changes in cam performance and using the predetermined adjustment relationships to modify the polynomial by scaling the polynomial coefficients; and
   (d) outputting a modified base profile describing cam inputs and cam outputs derived from the polynomial with the modified polynomial coefficients.

15. The electronic computer of claim 14 wherein the polynomial is a piecewise polynomial spline defined between multiple cam output values representing points of zero acceleration in the cam profile.

16. The electronic computer of claim 14 wherein the base profile is partitioned into a set of segments having a value of zero acceleration at segment endpoints and wherein step (c) modifies the base profile by individually scaling at least one coefficient of the orders of the polynomial coefficients across the polynomial equations independently for each segment and then piecewise assembles the segments after scaling to provide a modified base profile.

17. The electronic computer of claim 14 wherein the cam modification instructions are modifications of at least one of cam output position change for given cam input change and cam output velocity change for given cam input change.

18. The electronic computer of claim 17 wherein the earn modification instruction is an instruction to change a given cam velocity by a given amount.

19. The electronic computer of claim 14 further including the step of determining dynamic properties of the modified base profile.

20. A system fir generating electronic cam profiles comprising an electronic computer having a human machine interface and executing a program in non-transitory medium to implement:
   (a) a polynomial calculator receiving a polynomial order and coefficients to provide a polynomial-generated electronic cam profile according to a polynomial equation defined by the polynomial order and coefficients;
   (b) an inverse kinematics calculator receiving a computer model of a mechanism including an input operator and output operator and simulating operation of the model of the mechanism to provide a kinematics-generated electronic cam profile describing the function between position of the input operator and output operator; and
   (c) a coefficients scaling calculator: (i) receiving a polynomial spline describing a functional relationship between a cam input and a cam output, the polynomial spline being a piecewise assembly of function segments described by a polynomial equation having coefficients with orders; (ii) receiving from a user through the human machine interface cam modification instructions describing a desired functional relationship between a cam input and cam output; and (iii) modifying the polynomial spline by sealing at least one of the orders of the polynomial coefficients across the polynomial equations describing the base profile to provide a modified spline-generated electronic cam profile;

the program further outputting at least one of the polynomial-generated electronic cam profile, the kinematics-generated electronic cam profile, and the modified spline-generated electronic cam profile to be received by an industrial control system for implementing a virtual cam.

\* \* \* \* \*